United States Patent [19]
Bush et al.

[11] Patent Number: 5,245,658
[45] Date of Patent: Sep. 14, 1993

[54] DOMAIN-BASED ENCRYPTION

[76] Inventors: George Bush, 1675 York Ave., Suite 34B, New York, N.Y. 10128; Estelle F. Ross, 41 Buxton St., Lido Beach, both of N.Y. 11561

[21] Appl. No.: 817,440

[22] Filed: Jan. 6, 1992

[51] Int. Cl.$^5$ .............................................. H04K 1/00
[52] U.S. Cl. ..................................... 380/28; 380/21; 380/43
[58] Field of Search ............... 380/18, 21, 28, 30, 380/36, 37, 42, 43, 49, 50

[56] References Cited

U.S. PATENT DOCUMENTS

| | | | |
|---|---|---|---|
| 4,386,416 | 5/1983 | Giltner et al. | 380/49 X |
| 4,441,095 | 4/1984 | Widmer et al. | 380/28 |
| 4,607,137 | 8/1986 | Jansen et al. | 380/21 |
| 4,771,462 | 9/1988 | Hannan et al. | 380/50 X |
| 5,003,597 | 3/1991 | Merkle | 380/28 |
| 5,113,444 | 5/1992 | Vobach | 380/28 X |

Primary Examiner—Tod R. Swann
Attorney, Agent, or Firm—Kane, Dalsimer, Sullivan, Kurucz, Levy, Eisele & Richard

[57] ABSTRACT

A domain-based encryption system which uses identical domains known only to the parties involved in the communication. An encrypted message is sent between communicating parties which consists of a stream of coordinates which locate specific points in the domains. The located points comprise a symbol set that forms the plaintext message.

3 Claims, 7 Drawing Sheets

FIGURE 1

|   | 9 | 10 | 11 | 12 | 13 |
|---|---|----|----|----|----|
|   | A | B  | C  | D  |    |
| 2 | E | F  | G  | H  |    |
| 3 | I | J  | K  | L  |    |
| 4 | M | N  | O  | P  |    |
| 5 | Q | R  | S  | T  |    |
| 6 | U | V  | W  | X  |    |
| 7 | Y | Z  | S  | L  |    |
| 8 |   |    |    |    |    |

FIGURE 2

|    | 1 | 2 | 3 | 4 | 5 | 6 | 7 | 8 |
|----|---|---|---|---|---|---|---|---|
| 9  | D | A |   | K |   | X |   | Y |
| 0  | R | M | Q |   | G | T |   |   |
| 11 | B | V | J |   | E |   | O | F |
| 12 | L | E | Z | H | C | O |   | U |
| 13 | I | S | W | N |   | H |   | P |

| | A | B | C | D | E | F | G |
|---|---|---|---|---|---|---|---|
| 1 | 7 | 9 | 3 | 0 | 6 | 2 | 1 |
| 2 | 9 | 7 | 1 | 1 | 8 | 3 | 6 |
| 3 | 5 | 9 | 0 | 2 | 4 | 8 | 9 |
| 4 | 9 | 0 | 3 | 2 | 7 | 3 | 5 |
| 5 | 0 | 4 | 7 | 2 | 7 | 5 | 3 |
| 6 | 6 | 2 | 3 | 8 | 3 | 1 | 8 |

Number = 479321

Coordinates = 5 - B,
4 - E, 3 - B, 2 - F,
6 - B, 2 - D

Identification Domain X

| | C | 5 | F | 6 | ✱ | 8 | 0 |
|---|---|---|---|---|---|---|---|
| W | 4 | 8 | 0 | 2 | 3 | 9 | 0 |
| 3 | 7 | 2 | 8 | 1 | 2 | 7 | 9 |
| % | 5 | 7 | 2 | 4 | 9 | 5 | 0 |
| 1 | 8 | 1 | 9 | 8 | 7 | 1 | 3 |
| 5 | 3 | 8 | 2 | 0 | 7 | 2 | 7 |
| 0 | 5 | 9 | 2 | 2 | 3 | 9 | 3 |

Number = 479321

Coordinates = W - C,
% - 5, 0 - F, 0 - ✱,
3 - ✱, 1 - 5

Identification Domain Y

DOMAIN-BASED ENCRYPTION

BACKGROUND OF THE INVENTION

In the prior art, the generally accepted form of sending an encrypted message is by means of secret key encryption. This prior art system involves the use of a secret key known by the corresponding parties. The secret key is used with an algorithm to transform a plaintext into its encrypted form. As an example: let "sell short" be the plaintext. Let "X" be the key and "the number of the letter in the alphabet/X" be the algorithm. Let the answer be carried two digits to the right of the decimal point. Additionally, the decimal point will not be expressed. In this case let "X" be 5. Thus the first letter of "sell short", is expressed as s=19/X=19/5=3.80=380. "Sell short" would be encrypted as 380-100-240-240-380-160-300-360-400.

In this prior art system, it would superficially seem that the encrypted version and the plaintext version of the message have no similarity. However, an intruder who understood the system could find the key by means of computer analysis and could decrypt the message. Central to this explanation is that the plaintext version of a message is an integral part of all secret key encrypted communications. This makes secret key encrypted messages vulnerable to decryption by a skilled intruder using computers.

Another problem with secret key encryption is the secure exchange of keys between the communicating parties. There must be a face-to-face meeting or some other secure method of key exchange. This can be difficult and/or expensive if the parties are in different geographic areas.

A recent innovation in the field of cryptography is Public Key encryption. This system makes use of inverse functions, that is, a function that is easy to work in one direction and very hard to work in the other direction. Currently, a popular method, (RSA), uses two large prime numbers and their product as a two-part key. While the product can be computed given the primes, factoring the product into the two primes is believed to be beyond present number theory.

Typically the product of the two primes is a number of some 150 digits in length. The aforementioned product is published in a public directory hence the name Public Key encryption. To use the system, one would use the recipient's public key to encrypt a message. The recipient would use one of the primes, (his secret key), to decrypt the message. This method has an advantage over secret key encryption in that it allows communications in a secure manner without the burden of exchanging keys. While RSA encryption is currently thought to be safe, advances in computers and more importantly, in number theory make the prospect of breaking such a system feasible. If an intruder can factor a Public Key into its two primes, he will be able to decipher the encrypted message.

SUMMARY OF THE INVENTION

The present invention provides a system in which the plaintext of the message is never sent, even in highly modified form, between the communicating parties. Instead, the message consists of a stream of coordinates which define the location of points in unique, commonly held domains.

BRIEF DESCRIPTION OF THE FIGURES

FIG. I is a single plane domain which is referred to herein as Domain I.

FIG. II is a single plane domain which is referred to herein as Domain II.

Figure 3:
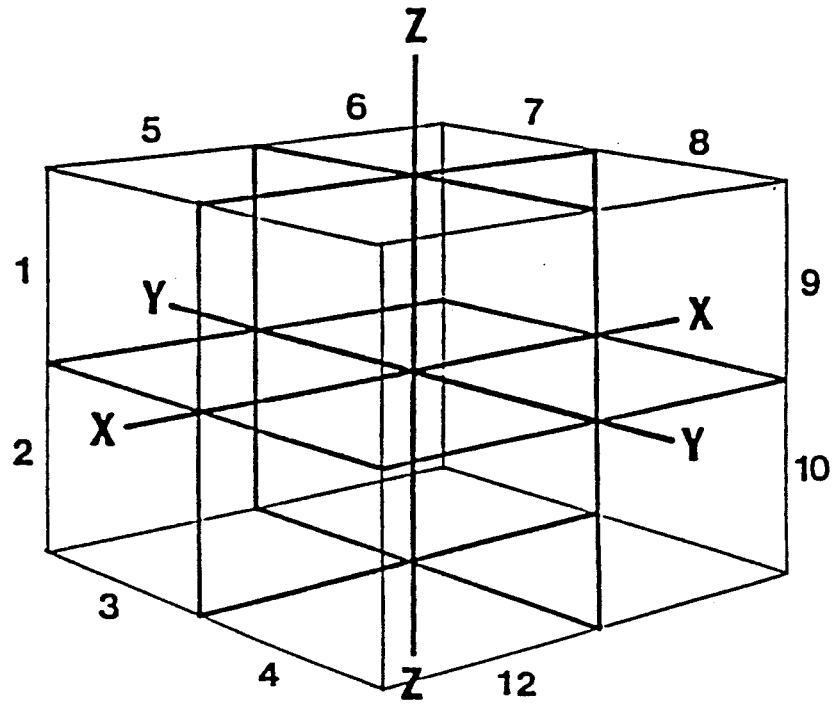
Figure 4:
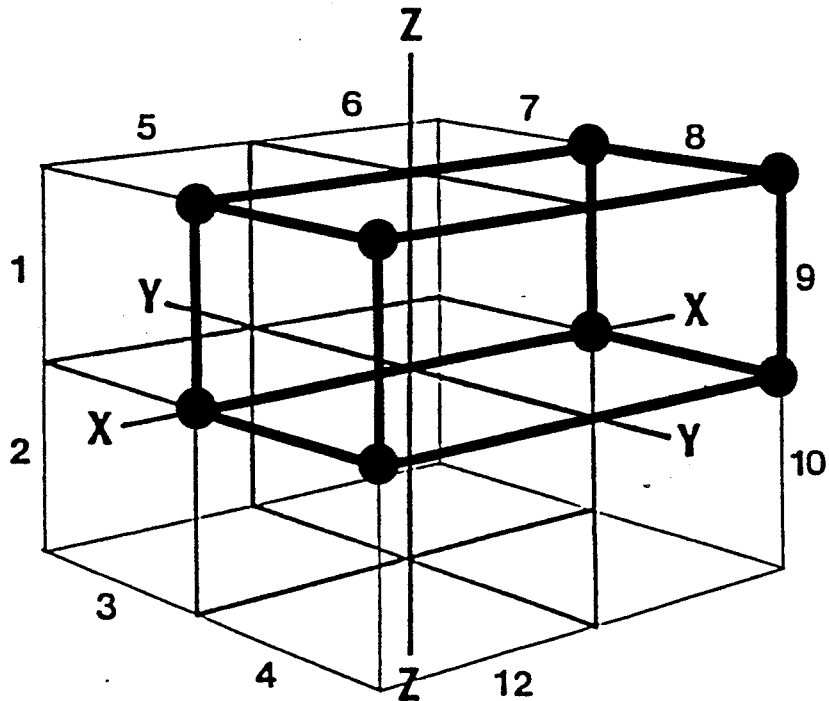
Figure 5:
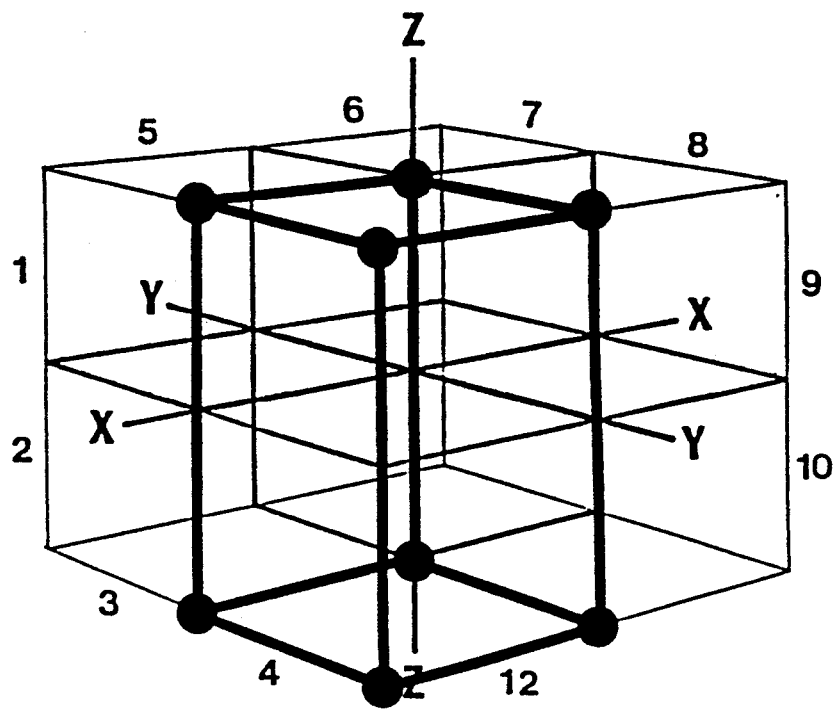
Figure 6:
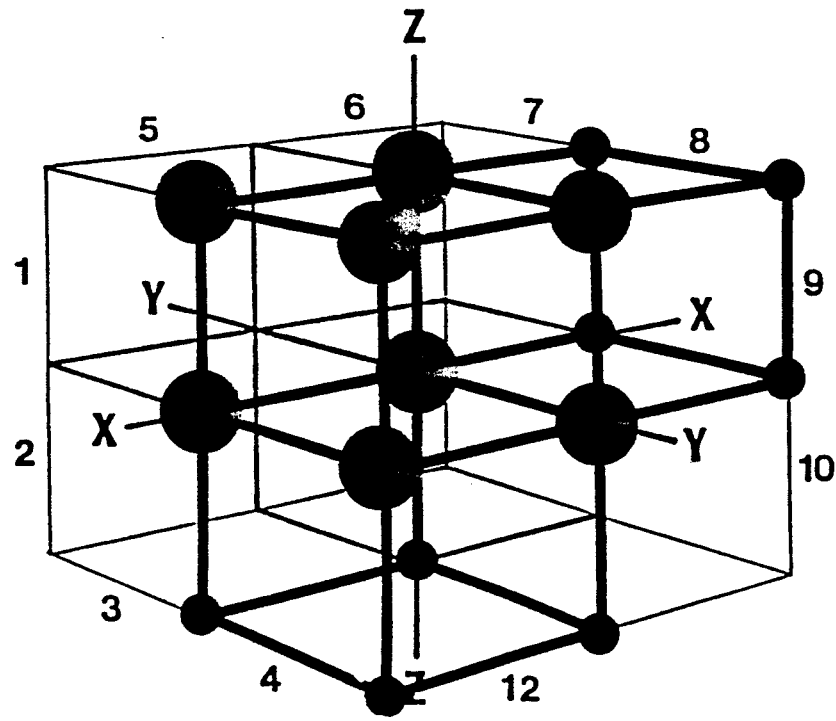
Figure 7:
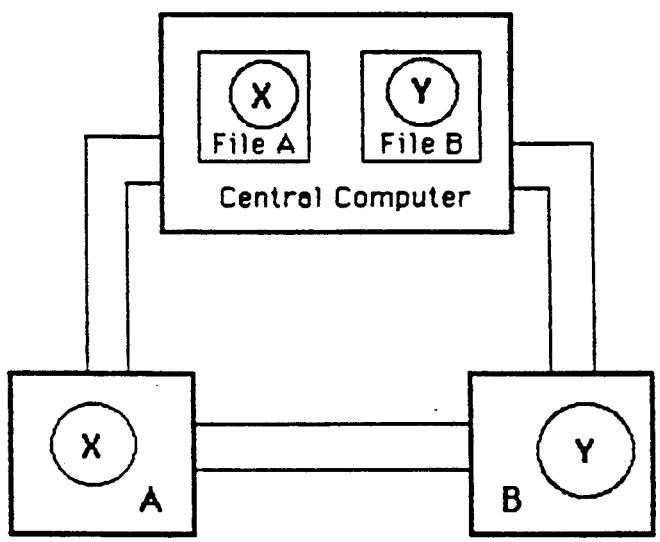
Figure 8:
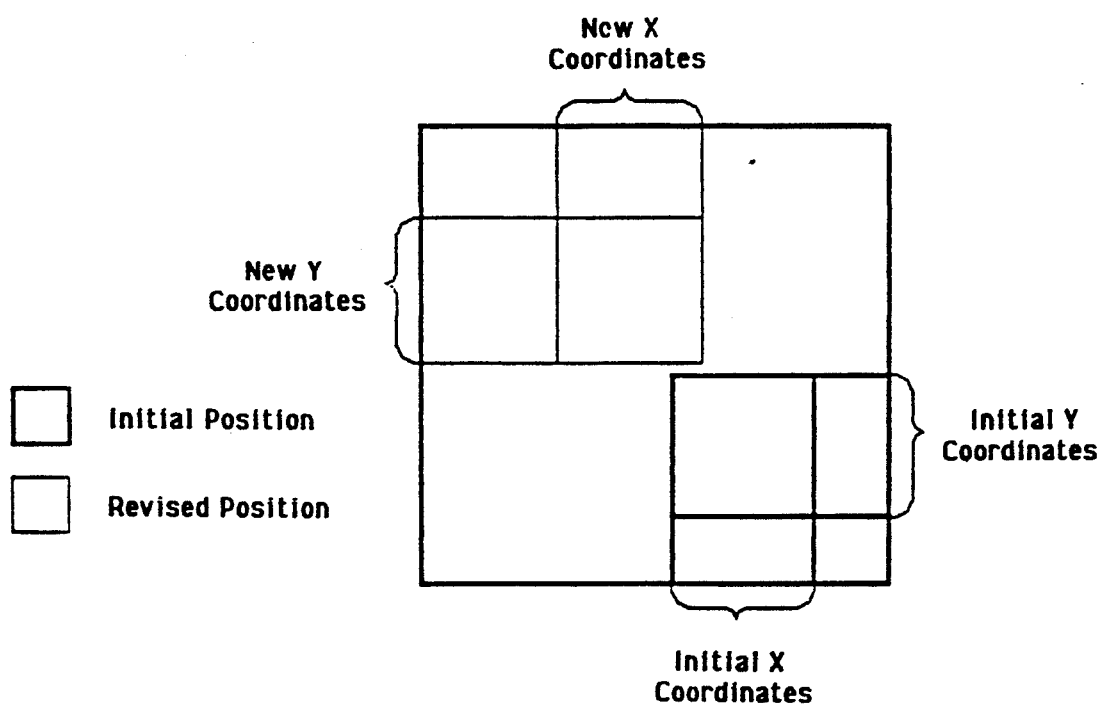
Figure 9:
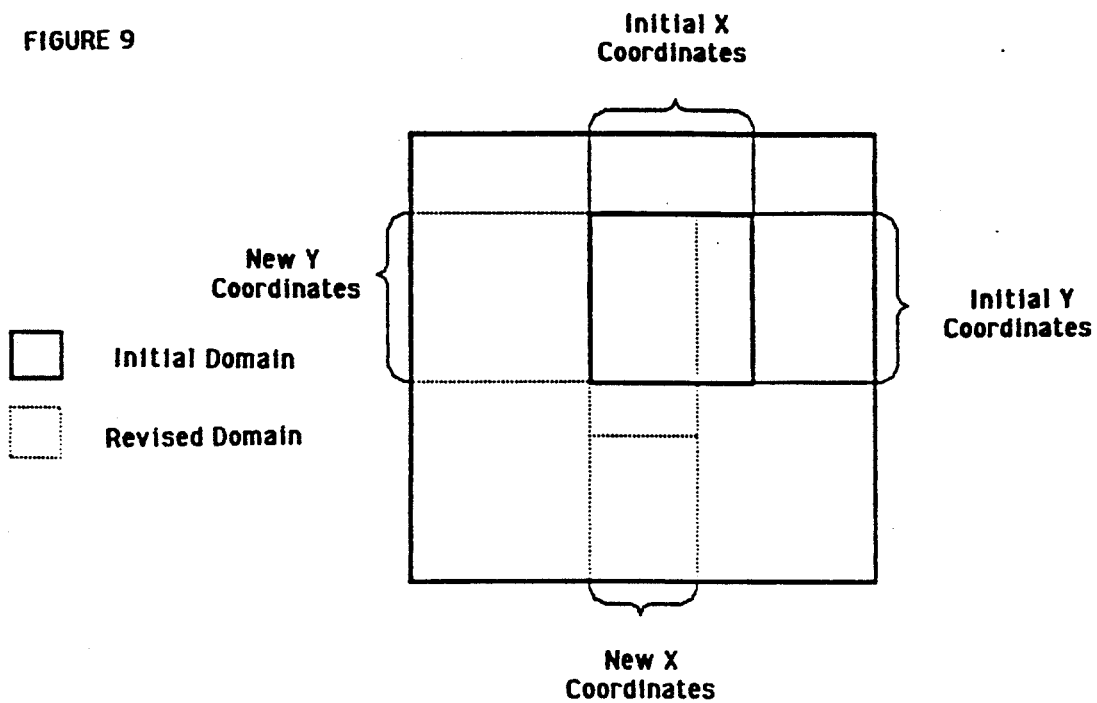
Figure 10:
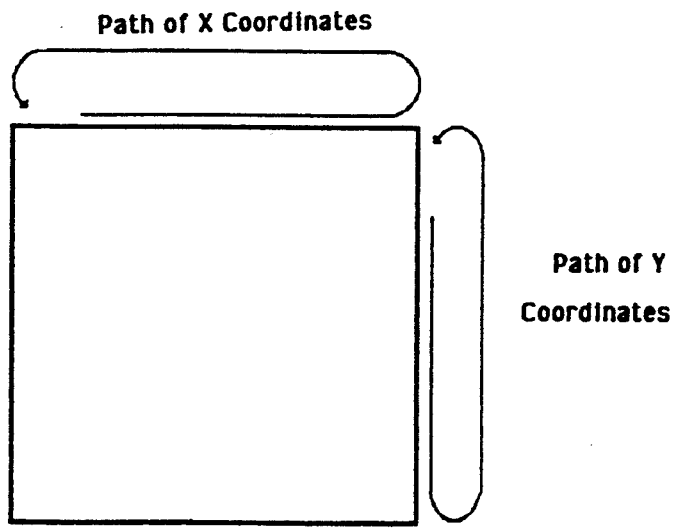
Figure 11:
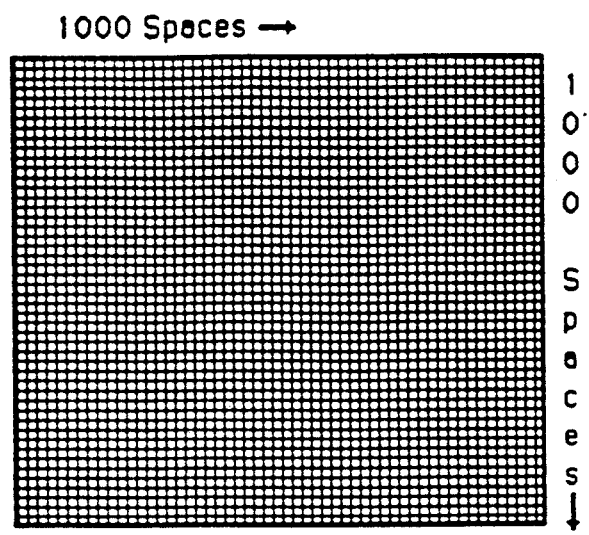
Figure 12:
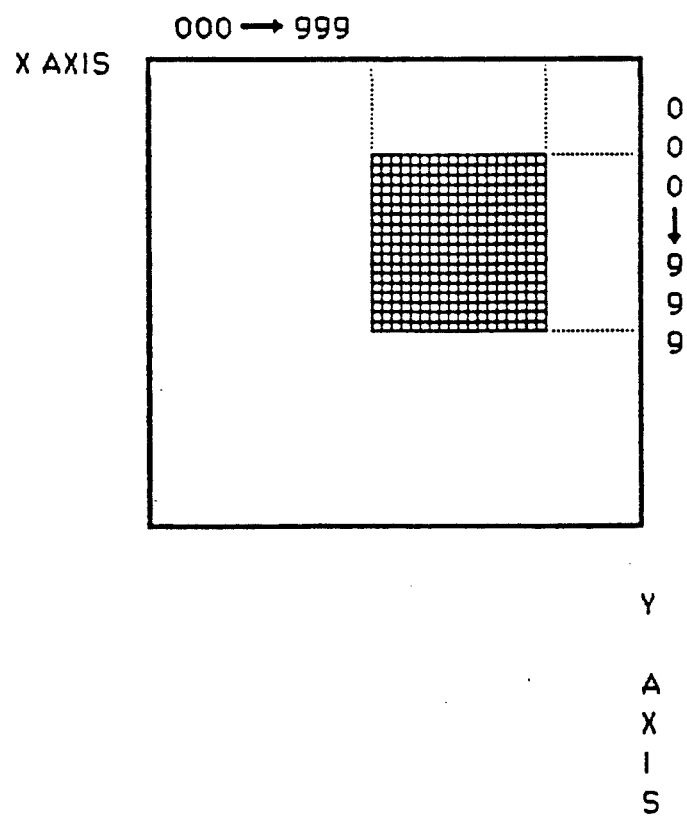

FIG. III is a three plane domain which is referred to herein as Domain III.

FIG. IV which is referred to herein as Domain IV, is Domain III with the delineation of one column.

FIG. V which is referred to herein as Domain V, is Domain III with the delineation of a second column.

FIG. VI which is referred to herein as Domain VI, is Domain III with the previously mentioned columns of Domains IV and V superimposed on each other so as to designate a cell.

FIG. VII illustrate a method in accordance with the teachings of this invention whereby set-up keys may be exchanged in a secure manner.

FIG. VIII illustrates an example of a simplified version of a change protocol set and its operation.

FIG. IX illustrates the result of the initial set-up in the example shown in FIG. VIII.

FIG. X illustrates the effect of a change in the shape of the active domain in the example of FIG. VIII.

FIG. XI illustrates the effect of a change in coordinates governed by a random time interval in the example of FIG. VIII.

FIG. XII illustrates the effect of moving the active domain within the larger domain in the example of FIG. VIII.

DETAILS OF THE INVENTION

FIG. I shows a simple example of a domain and a data stream, (7-11, 2-9, 12-7, 4-13, 8-10, 9-14, 3-12, 11-5, 2-12, 11-4, 5-13, 5-10, 17-5, 12-5), for the message "sell short". Even if an intruder were to know the system, he would have difficulty decrypting the message given the small sample size of the data stream and the lack of repetition for the second "1" and "s". Certain coordinates locate blanks and certain coordinates are imaginary. These factors would present no problem to the communicating parties but would pose considerable difficulties for an intruder.

The plaintext need not be alphanumeric. Any form of information including music and graphics may be sent provided the domain set has been adjusted for such use, or the information has been digitized. Domain-based encryption is practical through use of a computer. It would be possible to implement domain-based encryption using manual or mechanical methods, but the process would be slow and clumsy.

The example of domain-based encryption illustrated in FIG. I shows the basic concept of the system. If the domains are changed often so that a large coordinate sample from any one domain cannot be procured, an illegitimate deciphering of the message may become impossible. As an example; if, after the second blank space called out by the coordinates, the users were to switch to the domain shown by FIG. II, the message might very well become 7-11, 2-9, 12-7, 4-13, 8-10, 12-1, 15-7, 2-13, 11-4, 12-1, 6-12, 17-5, 1-10, 10-6. None of the coordinates are repeated, there are imaginary coordinates, the coordinates for duplicate letters differ, some of the coordinates call out blanks and two different domains are used in the data stream. The plaintext is still "sell short" but analysis is vastly more difficult.

Three factors must be present for system operation. As implied by the name, a domain is necessary for domain-based encryption. A domain may be defined as an arithmetic or geometric aggregate to which a variable is restricted and within which the variable may be placed anywhere. Secondly, for the purpose of the present invention, locations in the domain must be definable by a system of coordinates. The coordinates need not be alphanumeric. They might be based on color, musical notes, or star locations. Any discrete object or value will work. A final requirement is that communicating party's domains must be in synchrony. As an example, party "A" calls out coordinates for the domain of FIG. 1, while party "B" thinks the coordinates are for the domain of FIG. II. Party "B" will find the decrypted message to be gibberish. Thus, the communicating parties must be in synchrony, (i.e., be using identical domains).

The single plane domains in FIGS. I and II illustrate the domain-based encryption which is the subject of this invention. However, in practice, a domain-based system might use a multi-plane domain. FIG. III shows a three plane domain which can be used. The coordinates 1,2,3 and 4 are used to define points on the X axis. Coordinates 5,6,7 & 8 define points on the Z axis while coordinates 9,10,11 & 12 define points on the Y axis. FIG. IV shows how the coordinates 1-4 define a column through the domain on the X axis. FIG. V shows how coordinates 5-8 define a column through the domain on the Z axis. FIG. VI shows how a cell is designated by the intersections of the previously described columns. In a domain-based encryption system, the designated cell would contain some type of data. Notice that the cell might be designated by calling out different coordinates or reordering the coordinates. The same cell can be designated by the coordinates:

| | |
|---|---|
| 5-8 & | 1-4 |
| 1-4 & | 5-8 |
| 5-8 & | 9-12 |
| 9-12 & | 5-8 |
| 1-4 & | 9-12 |
| 9-12 & | 1-4 |

Of course one could call out 8-5 instead of 5-8 etc. Thus, completely differing data streams can designate the same cells.

While a single large multi-plane domain could serve as the basis for encryption, eventually a large sample of the data stream could be analyzed by an intruder and the structure of the domain defined. At this point the encryption might be broken. Changes in the domain keep an intruder from gathering a large, coherent sample of the data stream and are basic to domain-based encryption. As described earlier, an effective change might switch domains. Another change might alter the coordinate system. As envisioned, domain changes are governed by change protocols. These are a series of algorithms that define the aspects of the domains to be changed. The algorithms are constantly changed and influenced by the introduction of random factors so as to render domain changes unpredictable.

Heretofore, the domains and systems have been very simple as an aid to understanding. The following is a description of the invention as presently envisioned to be practiced. All system users would receive a computer disk, (or chip), containing a large number of domains and a large collection of algorithms for change protocols. Unique to each disk is an "Identification Domain" and an identification number. Otherwise, all the disks are identical, thus, all users start with the same reference materials. When an individual signs on to the system, a file is started in a central computer containing the Identification Domain and identification number. This joint holding by the central computer and user allows the central computer to send information to the user in the form of a stream of coordinates. The user's identification number is placed in a directory so that other users can communicate with him.

Initial communication between users starts with the exchange of set-up keys. These keys are used to modify the stock change protocols so that each user pair has a unique set of change protocols. FIG. VII illustrates an example of how this would work in practice. If A wishes to communicate with B, he or she begins by looking up B in the directory. A accesses the central computer via modem and identifies himself or herself and B using the respective identification numbers. The central computer looks up the files for A and B and sends a series of coordinates to A which will locate a set-up key, (479321), in A's unique Identification Domain, (X). The set-up key should have a random element, such as time of day, involved in its formulation so that it will be unpredictable. The central computer finds the same number, (479321), in B's Identification Domain, (Y), and sends out the attendant coordinates to B. In this manner, both parties are given the same set-up key, (479321), by the central computer although the coordinates given to each party have no relationship to those given the other party. Unless an intruder has access to A or B's Identification Domain, he will be unable to decrypt the communicating parties' set-up key.

The set-up key, 479321, the number given to A and B, is used to provide an initial starting point for communications and to the change protocols. A and B now have a set of change protocols that are unique and identical. They are in a synchronous state. When A and B wish to communicate, their systems will refer to these unique change protocols and configure unique domains from the standard domain package. A and B can communicate without having to contact the central computer again because they start at the same place and have synchronous running changes of their change protocols. If A and C wish to communicate, they must go through the central computer to define their own pair of unique change protocols.

As envisioned, the system will have provisions for the introduction of random keys by the communicating parties. The user-introduced (as opposed to central computer introduced) randomizing key would modify the change protocols and ultimately the domains, much as the set-up key does. As an example, the procedure would work like this. As A's computer is encrypting a message, it interrupts the process to generate a pseudo-random number. This number is the randomizing key. The key alters A's change protocols and is incorporated in the stream of coordinates sent to B. The key is preceded by a signal that alerts B's computer to the key along with start and stop signals. Because B's change protocols are altered by the randomizing key at the same point in the message as are A's protocols, A and B remain in synchrony although not in real time. B could decrypt the message weeks after it was sent, but his change algorithms will be in synchrony with those of A as long as he decrypts messages from A in the order that they are sent. User-introduced keys are secure because the data stream of coordinates is very small compared to the data contained in the domains. Because the data stream is a series of coordinates, an intruder cannot intercept a characteristic signal heralding a change. Thus an intruder has no way of knowing that the change protocols and domains have been reconfigured.

An example of an initial domain that might be used by A and B is a three plane domain similar in structure and operation to those shown in FIGS. IV, V & VI. Instead of 4 cells, there are 128 cells per axis. The total number of cells in the domain is $128 \times 128 \times 128 = 2,097,152$ cells. Scattered throughout the domain is a complete set of the 128 ASCI symbols plus several dozen duplicate and triplicate ASCII symbols, (for example, 2 dozen e's), along with several dozen blank or safe cells. This leaves the majority of cells empty. The ASCII cells and blank cells are the only legitimate cells in the data stream. If an intruder were to attempt to impersonate a legitimate correspondent, and mistakenly call out the coordinates of an illegitimate cell, the system might react by terminating the communication. As in a previous case, one could also use imaginary coordinates to confuse an intruder about the structure of the domain.

Change protocols determine the timing and the nature of domain changes. A and B might begin communications by referring to the above domain but would simultaneously switch to another domain as determined by their change protocols. A constant, seemingly random, synchronous domain change will take place during all communications. The change protocols will switch domains, modify domains and modify the change protocols. All of this is done so that an intruder will be faced with an unpredictable, constantly changing set of domains. Because these are synchronous running changes, A and B need only refer to their last change protocols to begin a new series of communications.

An embodiment of the invention finds application in specialized devices such as FAX machines. The FAX today is a major communication channel. FAX machines are open to intrusion in two main ways. Because FAXs are transmitted over telephone lines, a message can be stolen through electronic eavesdropping. Also, once a message reaches its destination, it may be read by an intruder who gains access to the recipient's FAX machine. Domain-based encryption would frustrate electronic eavesdropping, and machine access PIN codes in the recipient FAX's software would solve the problem of on-site intrusion.

Domain-based encryption can be integrated with a FAX machine in the following manner. Each FAX machine would contain a domain-based encryption package consisting of encryption domains, change algorithms, an Identification Domain and a file containing the PIN codes and names of authorized users. The encryption domains and the change algorithms would be identical in all machines, but the Identification Domains would be unique to each device. As envisioned, one of the phone companies would serve as a central computer storing each Identification Domain as well as the respective legitimate PIN codes and names in a secure file together with the corresponding phone number.

When party A wishes to send an encrypted FAX to party B, party A begins by entering his PIN code, then pushing the "Encryption" button on his machine and entering the name of the recipient. He then proceeds to send the FAX in the usual manner by dialing the FAX number of the recipient. Transparent to A, his FAX machine checks his PIN code for legitimacy, then dials the phone company. The FAX machine identifies itself and identifies the FAX recipient's file by means of the corresponding phone numbers. Then the FAX machine transmits the sender's PIN code in the form of coordinates that locate the code in the telephone company's identical copy of the sender's Identification Domain. The sender's FAX also transmits the recipient's name. The phone company accesses the sender and the recipient files, checks for the legitimacy of the sender's PIN code and the recipient's name, generates a pseudo-random number and downloads this number to the sender's FAX machine in the form of a data stream of coordinates.

The sender's FAX uses the coordinates to locate the pseudo-random number in its Identification Domain. The pseudo-random number is used to provide the set-up key for the encryption process and to provide change instructions for an alteration of the Identification Domain. The Identification Domain can be changed in every communication so that an intruder cannot gather enough information to deduce a legitimate user's Identification Domain.

The sender's FAX machine uses the set-up key to create a unique set of encryption domains and change algorithms from the standard configuration and encrypts the message using the altered domain package. The FAX downloads the encrypted message to the phone company which sends the message, the recipient's name, the sender's name, and the pseudo-random number to the recipient's FAX machine. The pseudo-random number is transmitted in the form of coordinates that locate this number in the recipient FAX machine's Identification Domain. The recipient FAX machine uses the pseudo-random number to synchronize its encryption domain and change algorithms with that of the sending machine, then uses this data to decrypt the incoming message. The recipient FAX machine stores the decrypted message in a file that can be accessed only by the PIN code designated by the name in the communication, then reconfigures its Identification Domain as instructed by the pseudo-random number. This interchange is transparent to the sender and the recipient of the FAX. Other than using PIN codes and entering the recipient's name, these individuals have taken no extraordinary action in the processing of an encrypted FAX.

It can be seen from the above, that use of the PIN codes allows only legitimate users to send and receive encrypted FAXs. The use of the central computer, (the phone company), allows individuals who do not know each other to communicate while, at the same time, dispensing with the need to exchange secret keys. The recipient of a FAX can be sure of the identification of the sender because the use of Identification Domains ensures that the sender's FAX machine is legitimate. The implementation of PIN codes ensures that the phone company has screened the sender for legitimacy. An intruder could not use a different FAX machine with a stolen PIN code because the set-up coordinates would produce a message that the recipient's machine could not decrypt. An intruder could not pose as a legitimate user if he had access to a legitimate machine because he does not know a legitimate PIN code. Given access to the recipient's FAX machine, an intruder could not access the decrypted message because he does not know the correct PIN code. Additionally, the domain-based encryption process is not vulnerable to electronic eavesdropping.

In order to assist in the understanding of the invention, the following example is provided as an illustration of a simplified version of a change protocol set and its operation. To make the example easier to follow, the domain set will consist of a single two axis domain. As shown by FIG. VIII, the domain has 1000 spaces on the X axis and 1000 spaces on the Y axis. In this example, the coordinates consist of a three digit number, 000-999 for the X axis and 000-999 for the Y axis. As a convention, the first three digits are the X coordinates.

The symbol set used in this example contains the 26 letters of the alphabet, the numerals 0-9, punctuation marks, a symbol for spaces and instructions. A typical instruction would be an alert that a pseudo-random number is being sent. When placed in the domain, the symbol set contains multiple examples of all symbols. The number of examples of each symbol varies according to frequency of use. As an example, there would be many more "e's" than "z's". All together, the domain would contain a symbol set of 1000 examples.

The change protocol set has three parts A, B and C. Each part has an instruction set and a set of algorithms. The instruction set acts through the algorithms to alter aspects of the domain and the change protocols themselves. In this example, part A is responsible for altering the change protocols. Part B is responsible for altering the coordinates of the domain and part C is used for dispersal of the symbol set.

The set-up code acts through part A, which in turn acts on parts B and C to provide the initial domain configuration and symbol set dispersion. After the initial set-up, part A governs changes in the domain set until interrupted by a user generated randomizing key. The randomizing key has the same effect as a set-up key in that it alters part A through the introduction of a pseudo-random number.

In this simple example, illustration IX shows the result of the initial set-up. The coordinates, (000-999), have been dispersed about the periphery of the domain in random order. Thus, the first coordinate on the X axis is shown as 487, the second shown as 025, etc. The X and Y axis are regarded as having separate 000-999 coordinate sets. The placement of the coordinates is governed by part B. As shown in the illustration, a smaller domain has been placed in the larger domain. This domain, which has 128 spaces on the X and Y axis, is the active domain. The coordinates for this domain are determined by the position of the small domain in relation to the large domain.

Part C determines the dispersal of the symbol set throughout the active domain. The mechanism used in this initial placement is analogous to a "grab bag" in that the coordinates of the active domain are placed in a file then matched at random with various elements of the symbol set. The resultant collection of coordinates and symbols is placed in a file and serves as the working set. The file will have two sets of symbol/coordinate pairs. One set will be organized by symbol as an aid to encryption. The other will be organized by coordinate to aid decryption.

In this example, the trigger for change will be based on the convention that a symbol/coordinate pair is not to be repeated. If the symbol set contains 15 "s's" and a 16th "s" is called for, the change protocols would be enacted to alter the domain configuration.

To keep this example simple, part B would be able to alter coordinate set-up in four ways:

1. The first is a "grab bag" technique whereby the coordinates are placed in a file and selected at random.

2. The next technique is to change the configuration of the active domain. As shown by illustration X, a change in the shape of the active domain will alter the position of the active domain in relation to the larger domain, thus changing the coordinates of the active domain.

3. A third technique would be to play "musical chairs" with the coordinates governed by some random time interval. As shown by illustation XI, the coordinates must "wrap around" to allow the technique to work properly.

4. A final technique is to move the active domain within the larger domain. As shown by illustation XII, this has the effect of altering the coordinates of the active domain.

In this example, group C uses two techniques for symbol dispersal:

1. The first uses the "grab bag" effect to match symbols and the active coordinates.

2. The second technique is through use of an offset. As an example, move the symbols up four cells and two cells to the left. This method would have to be used carefully to avoid placing symbols outside of the active domain.

As envisioned, any change would consist of first altering the coordinates, then altering the placement of the symbol set. With these actions there will be no repetition of symbol/coordinate pairs. Because the coordinates are in random order to start with, there is no creating of a pattern that might inform an intruder of a change in domain configuration.

While the foregoing embodiments of the invention have been disclosed in considerable detail for the purposes of illustration, it will be understood by those skilled in the art that many of these details may be varied without departing from the spirit and the scope of the invention as stated in the appended claims.

We claim:

1. A system for exchanging initial set-up keys between communicating parties wherein a unique Identification Domain means for each respective party is held in a central computer and by each respective communicating party wherein set-up keys of the communicating parties are located in the respective unique Identification Domain of each of said parties and are generated on a one time, on demand basis under control of the central computer.

2. A system in accordance with claim 1 in which the set-up keys are generated by said central computer.

3. A system in which a change to both the sender and recipient protocols occurs upon the sending party interrupting transmission to generate a pseudo-random number as a key to change protocol alteration.

* * * * *